United States Patent [19]
Weider

[11] 3,802,574
[45] Apr. 9, 1974

[54] STORAGE RACKS AND CURB THEREFOR
[75] Inventor: John J. Weider, Arlington Heights, Ill.
[73] Assignee: Speedrack Inc., Skokie, Ill.
[22] Filed: June 2, 1972
[21] Appl. No.: 258,974

[52] U.S. Cl.................. 211/134, 108/111, 169/2 R
[51] Int. Cl. ............................................. A47f 5/00
[58] Field of Search .......... 211/134, 148, 177, 127; 108/111, 64; 312/107, 111; 5/131; 169/2 R

[56] References Cited
UNITED STATES PATENTS
1,996,515  4/1935  Howell........................... 211/134 X
3,580,398  5/1971  Schafer.............................. 211/148
3,626,487  12/1971  Seiz................................... 211/176

FOREIGN PATENTS OR APPLICATIONS
402,488  12/1933  Great Britain..................... 211/148

Primary Examiner—Ramon S. Britts
Attorney, Agent, or Firm—Fitch, Even, Tabin & Luedeka

[57] ABSTRACT

A pair of horizontally spaced apart pallet racks are provided with a curb which is positioned between horizontally aligned adjacent beams of the two storage racks. The curb restrains a pallet from being placed too far rearwardly of the pallet storage shelf.

8 Claims, 3 Drawing Figures

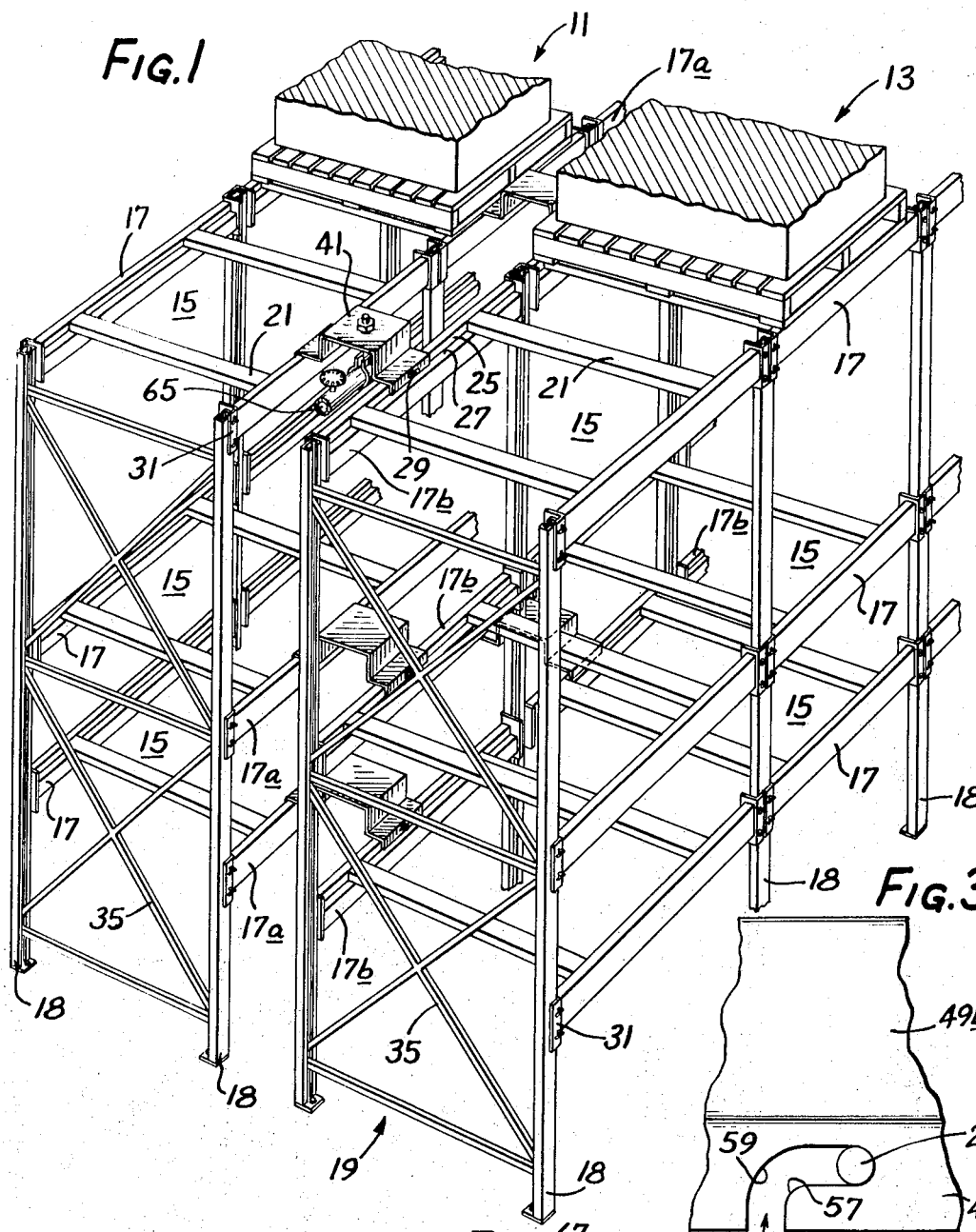
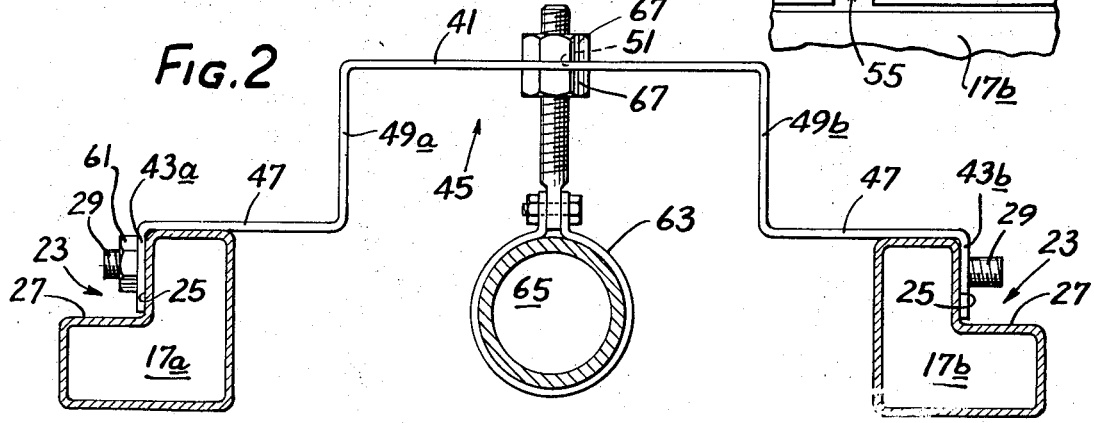

STORAGE RACKS AND CURB THEREFOR

The present invention relates to storage racks and more particularly is directed to a curb or stop to be used in conjunction with storage racks on which palletized loads are stored.

It is a common procedure to store items on pallets so that the stored items may be picked up and moved by forklift trucks, and the like. Forklifts move the load by engaging the pallet and are used to transfer the palletized load to and from storage shelves or tiers provided by storage racks, such as pallet racks. Pallet racks typically provide multilevel storage by supporting decking upon pairs of horizontal beams which are suitably connected between upstanding support posts.

Frequently, such pallet racks are deployed in a back-to-back relationship to make efficient utilization of warehouse floor space. When this is done, it is common to provide a space between the racks, primarily for fire prevention purposes. The open space allows access to the back of the racks by sprinkler systems or the like.

When a forklift deposits a pallet on a storage shelf it may happen that the forklift will shove the pallet beyond the rear of the storage shelf. This blocks the open space between the two racks and may result in the pallet striking the items carried on the shelf of the storage rack immediately to the rear.

It is the object of the present invention to provide a curb for positioning between back-to-back storage racks which will restrain pallets from being placed too far rearward on a pallet supporting shelf.

Another object of the present invention is to provide a pallet stop which may be quickly and easily positioned on or removed from pallet storage racks.

A further object is to provide a spacer for adjacent storage racks to aid in their assembly.

These and other objects and advantages of the invention will become apparent upon reading the following detailed description in conjunction with the accompanying drawings in which:

FIG. 1 is a perspective view of a storage rack arrangement employing curbs having features of the present invention;

FIG. 2 is an enlarged front view, partially in section, of a curb, a water sprinkler pipe being supported thereby and a portion of the storage rack arrangement of FIG. 1 taken along lines 2—2; and, FIG. 3 is an enlarged fragmentary side view of the curb and storage rack arrangement of FIG. 1.

Referring to FIG. 1 of the drawings, there is shown a pair of illustrative pallet storage racks 11 and 13 spaced a predetermined distance apart in a back-to-back relationship and forming a storage rack arrangement. The particular racks shown are designed to be quickly assembled and disassembled, and each rack provides a plurality of parallel vertically spaced shelves or tiers 15. The shelves 15 are each defined by a pair of parallel horizontal beams 17 which support decking or planks 21 which extend therebetween. The beams 17 are located at the front and rear of each rack and are supported on each end by an upright or post 18 which may be a part of a composite truss 19.

More specifically, each beam 17 is generally L-shaped in cross section, having an inwardly disposed recess defined by a vertical surface 25 and a horizontal surface or ledge 27. On the vertical surface 25 there is provided at least one cylindrical stud 29 which extends perpendicularly outward and in the illustrated embodiment is longitudinally centrally located. The studs 29 are located slightly above the center line of the vertical surface 25. The stud is threaded to receive a self-locking nut. The function of the studs 29 is described hereinafter in greater detail.

The ends of the beams 17 are provided with angle iron connectors 31 which permit the beams to be quickly attached to or detached from the uprights 18. The connector 31 is described in detail in U.S. Pat. No. 2,932,368, issued Apr. 12, 1960 to B. E. Schell, Jr. and utilizes appropriate pin holes provided in the uprights 18 to position the beams 17 at a desired vertical level.

The upright truss 19 is a welded assembly comprising two uprights to posts 18 connected by double diagonal bracing 35. Individual uprights 18 are also used, but at each end and at selected intervals throughout a long storage rack array, trusses 19 are employed to add rigidity to the rack structure. The illustrated decking 21 is provided by bars or planks, the ends of which rest on the horizontal ledge 27 of the beams.

Rack 13 is located immediately to the right of rack 11 in back-to-back relationship thereto and is spaced apart from rack 11 a uniform distance along its length. Rack 13 is similar to rack 11 and has three pallet supporting shelves which are in horizontal alignment with the shelves of rack 11. For purposes of reference, the rear beams of rack 11 shall be referred to as beams 17a and the rear beams of rack 13 shall be referred to as beams 17b.

Connecting the adjacent horizontally aligned beams 17a and 17b of the two rack structures is a curb or stop 41. This curb 41 is formed with a pair of parallel flanges 43a and 43b which are spaced apart a sufficient distance to flank the vertical surfaces 25 of the ledges of the beams 17a and 17b respectively. A web 47 interconnects the two flanges 43. In its center portion the web 47 defines a U-shaped section 45 which provides two abutments 49a and 49b, each spaced an equal distance from its respective adjacent flange 43. Each abutment 49 extends upward a predetermined distance. An aperture 51 or bolt hole, extends through the web 47 and is centrally located in the upper portion of the web 47 between the abutments 49.

A generally L-shaped slot 55 is formed in each flange 43 to receive the aforementioned stud 29. One leg of the slot is in communication with the bottom edge of the flange 43, and the other leg of the slot extends longitudinally along the flange, parallel to the bottom edge. The slot 55 has a width which accommodates the stud 29 without excessive force being necessary to push the curb 41 onto the stud 29, the width of the slot being slightly greater than the diameter of the stud. The interior corner of the L-shaped slot 55 is rounded, having an inner curved side 57 and an outer curved side 59.

To position a curb 41 on a pair of beams 17 of previously assembled racks 11 and 13, the entry openings of the two slots 55 are positioned directly over a pair of studs 29, one from each of the two beams. The curb is then pushed downward until, after an initial downward displacement, the curb begins to move laterally as the studs reach the curved portion of the slots. A final lateral force places the studs at the end of the parallel legs of the slots. Lock-nuts 61 are then threaded on the studs 29 to rigidly fix the curb to the beams.

The curb 41 is constructed to have its abutments 49 extend above the supporting beams 17 so that a pallet placed on the shelves 15 is restrained from moving rearwardly beyond the surface defined by the abutment 49, thus providing a positive pallet stop. The curb 41 is made of a sufficient side dimension so that it is rigid, but does not itself provide any significant obstruction of the space between the racks. One curb is employed in the region of each pallet storage space so that no pallet may pass rearward thereof.

In the preferred embodiment, the curb 41 is formed from a flat piece of ten gauge steel which is bent to have the desired configuration. The studs 29 extend outward from the vertical surface 25 of the beams a distance considerably greater than the thickness of the curb 41. Thus, should the racks 11 and 13 be positioned too close together, such that the flanges 43 are not touching the vertical surfaces 25, the slots 55 may still engage their respective studs 29 to fix the curb to the racks.

In this regard, it is preferred that the curb 41 be secured to the beam 17 of one rack, prior to the adjacent rack being assembled or fixed in place. In this manner the curb 41 may be used as a spacer for the other rack; the beams 17 of the second rack being first fixed to the free flange 43 of the curb 41 prior to the second rack being rigidly attached to the warehouse floor. Thus the curbs 41, when used as spacers, insure the back-to-back racks 11 and 13 are uniformly spaced the proper distance apart.

In the preferred embodiment the curb 41 is adapted to have the web portion 47, which interconnects the U-shaped abutment 45 to the flanges 43, rest flat against the uppermost surface of the beams 17 when the studs 29 are fully seated in the slots 55. This adds additional stability to the curb 41 which is especially desirable if the flanges 43 are not in surface-to-surface contact with the vertical surfaces 25 of the beams. For this purpose, the portion of the web 47 between a flange 43 and the U-shaped abutment 45 extends horizontally for a distance which is significantly greater than the length of the uppermost horizontal surface of the beams 17. This in turn normally places the U-shaped abutment 45 interiorally of the beams 17.

With a plurality of curbs 41 positioned between adjacent beams 17, the apertures 51 may be utilized to support a water sprinkler system at the optimum position to protect the contents of the racks from fire. "Eye bolts" 63 are clamped about a sprinkler pipe 65 and the bolts 63 are each located in their respective apertures 51. The bolts 63 are then fixed to the curbs 41 by appropriate nuts 67. The bolts 63 are vertically positioned in the aperture 51 to place the sprinkler pipe 65 directly between the opposed beams 17. The sprinkler heads (not shown) are thereby ideally positioned to spray the contents of the racks. Further, by locating the sprinkler pipes between the beams 17, they are protected by those beams from damage by impact with forklifts, etc. While in the illustrated embodiment, only the top row of curbs 41 is shown supporting a sprinkler pipe 65, sprinkler pipes could be attached to all horizontal rows of curbs 41.

While one specific embodiment of the invention has been shown and described, it should be apparent that various modifications could be made therein without departing from the scope of the invention. For example, the flanges 43 of the curb 41 need not extend downwardly along the vertical sides 25 of the ledges of the beams, but could be adjacent the rear vertical surface of the beams 17. The studs 29 would be located on the rear vertical surface of the beams 17 and extend perpendicularly from that surface. The slot 55 would engage these studs 29 in a manner similar to that previously described and fix the curb to the beams.

Various features of the invention are set forth in the following claims.

What is claimed is:

1. A rack assembly comprising first and second storage racks horizontally spaced apart in a back-to-back alignment and a curb, each rack including at least two spaced-apart upright support members and a horizonal beam extending between and connected to said upright members, said first rack having said beam located in horizontal alignment with said beam of said second rack, said curb having a pair of downwardly extending spaced apart, parallel flanges having their topmost edges connected by a web, a generally central portion of said web defining an upwardly extending abutment which is located at a level substantially above the remainder of said web, each of said flanges also extending parallel to said horizontal beams, said curb being disposed atop said aligned beams with each of said flanges being located adjacent respectively of a vertical surface portion of one of said aligned beams and with said abutment extending a predetermined distance above the upper surfaces of said beams.

2. The rack assembly of claim 1 wherein at least one of said beams includes a stud extending outward from a vertical surface thereof and said curb includes a slot provided in one said flange extending upward from the lower edge thereof which is proportioned to receive said stud.

3. The rack assembly of claim 2 wherein said slot is generally L-shaped.

4. The rack assembly of claim 1 wherein the underside of said remainder of the web is in surface-to-surface contact with the upper horizontal surface of each of said beams.

5. The rack assembly of claim 4 wherein said remainder of said web contains a pair of horizontal sections which respectively extend from said flanges and are connected to said abutment portion, said horizontal sections each being wider than said upper horizontal surface of one of said beams.

6. The rack assembly of claim 5 wherein said abutment is U-shaped and is defined by two generally vertical walls having their topmost edges interconnected by a horizontally extending center portion.

7. A rack assembly comprising first and second pallet storage racks located with their fronts adjacent different aisles and horizontally-spaced apart in back-to-back alignment with each other, each rack including at least four uprights and having horizontal beams extending between and respectively interconnecting pairs of rear uprights and pairs of front uprights, said horizontal beams which interconnect said rear uprights of said first and second racks being disposed at the same vertical level, and a curb extending between said rear horizontal beams of said first and second pallet racks, said horizontal beams each being formed with a longitudinally extending recess that is defined by a vertical surface and a horizontal surface, said curb having a central abutment portion formed as part of a web section, which web section terminates in a pair of vertical flanges, said curb being disposed atop said pair of rear beams with each of said flanges being disposed adjacent one of said recess-defining vertical surfaces and with said abutment portion extending substantially above the upper surfaces of said rear beams.

8. The rack assembly of claim 7 wherein at least one of said rear beams includes a stud extending outward from said recess-defining vertical surface and wherein one curb flange includes a generally L-shaped slot which is proportioned to receive said stud.

* * * * *